Figure 1:
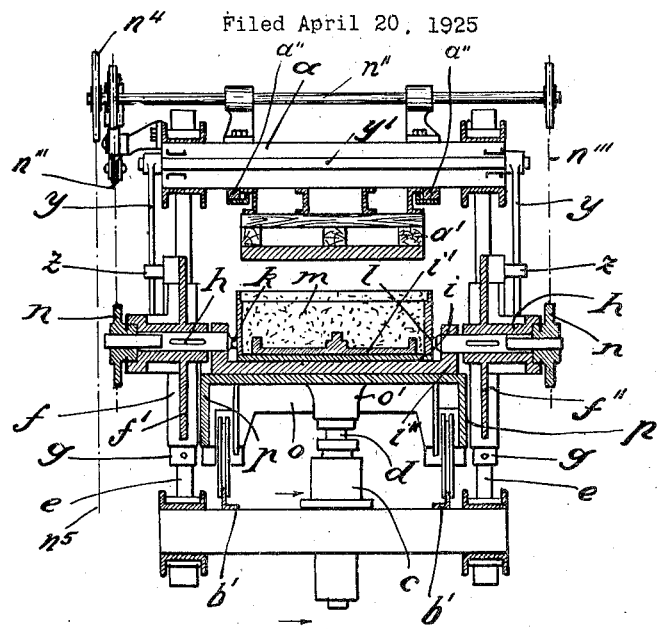

Feb. 16, 1926.

O. MÜLLER

MOLDING MACHINE

Filed April 20, 1925

1,573,009

Inventor:
Otto Müller
by [signature]
Atty.

Patented Feb. 16, 1926.

1,573,009

UNITED STATES PATENT OFFICE.

OTTO MÜLLER, OF ESSLINGEN-ON-THE-NECKAR, GERMANY.

MOLDING MACHINE.

Application filed April 20, 1925. Serial No. 24,594.

*To all whom it may concern:*

Be it known that I, OTTO MÜLLER, a citizen of Germany, residing at Esslingen-on-the Neckar, Germany, have invented certain new and useful Improvements in Molding Machines, of which the following is a specification.

My invention relates to molding machines and more especially to the type of molding machines which are equipped with turn-over plates which can be run in and out on tables or the like. It is an object of my invention to improve this type of machine generally and to overcome certain drawbacks adhering to them.

In these machines, the turn-over plates are supported in bearings without however being readily exchangeable therein, and the flasks are secured to the turn-over plates by means of screws, lugs and the like, which is rather troublesome. The loosening of the turn-over plate by tapping is much interfered with by the fact that the plate is supported in bearings, and so the pattern does not come off readily and the mold is often damaged. Moreover the pins and bearings for the turn-over plate considerably increase the width and weight of the machine, and separate mechanical means have to be provided for handling the plate.

All these drawbacks are overcome according to this invention by altogether dispensing with pins on the turn-over plate and preferably providing instead two eyes at opposite sides of the plate, in which pins, reciprocating on the frame of the machine can be inserted. These pins are preferably designed in such a manner as to secure not only the turn-over plate but also the flask. When the pins are withdrawn, the turn-over plate is perfectly free and can be tapped like any other pattern. The width and weight of the machine are much reduced by this arrangement, no separate means for handling the turn-over plate being required, as the raising and lowering of the plate is effected exclusively by means of a single cylinder. If the pins are so made as to engage the flask, separate means for securing the latter are unnecessary.

In the drawings affixed to this specification and forming part thereof a machine embodying my invention is illustrated diagrammatically by way of example.

In the drawings

Figure 2:
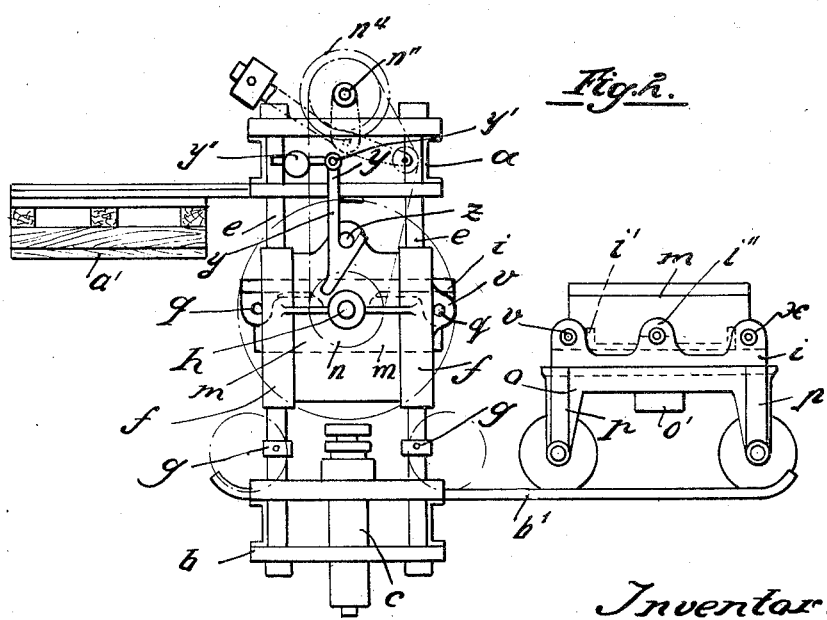

Figure 1 is a cross section of the machine on the line of the axis of the reciprocating pins, while Figure 2 is an elevation showing the table and the presser plate run out.

Referring to the drawings $a$ is an upper head, at the bottom of which a sliding presser plate $a'$ is suspended in guides $a''$. $b$ is a lower head, and $e$ are four pillars connecting the two heads.

A track $b'$ is secured to the lower head $b$, and a table $o$ is arranged to run on this track. The table $o$ is arranged to support the turn-over plate $i$, and suitable means, for instance a cylinder $c$ are provided on the lower head $b$ for exerting an upwardly directed pressure on a boss $o'$ of the table $o$.

Two frames $f'$, $f''$ extend along the shorter sides of the rectangle formed by the pillars $e$ and are guided on these pillars by pairs of sleves $f$, $f$, and supported by rings $g$ at the lower end of their stroke.

A pin $h$ is adapted to slide but held against rotation in each frame $f'$ $f''$, the ends of both pins being provided with right and left hand threads, respectively, and threaded sprocket wheels $n$ are seated on the threaded ends. The wheels $n$ are connected with wheels $n'$ on a shaft $n''$ by chains $n'''$, and rotation is imparted to the shaft $n''$ by means of a sprocket wheel $n^4$ and a chain $n^5$.

It will be understood that upon rotation of the shaft $n''$ the pins $h$ will be displaced in opposite directions. $i$ is the turn-over plate with the pattern $i'$. The turn-over plate is placed on the table $o$ and a flask $m$ is placed on top of the pattern. $i''$ are eyes formed at opposite ends of the turn-over plate and adapted to be engaged by the pins $h$. The pins are provided at their inner ends with points $k$ which are adapted to enter holes or recesses $l$ of the flask $m$. $x$, $x$ are pairs of eyes formed at the front and rear ends of the turn-over plate $i$, and $v$, $v$ are corresponding eyes at one end of each frame $f'$. Pins $q$ may be inserted in the eyes $v$ and the corresponding eyes $x, x$ so as to secure the turn-over plate to the frames $f'$ if desired. It will be understood that only one eye $v$ and $x$ respectively is shown, as the opposite parts are concealed by those that are visible.

$z, z$ are pins projecting on the outside of each frame $f'$ and adapted to be engaged by hooks which are rotatably carried on a shaft $y'$ and provided with counter weights $y''$.

The table $o$ has plane faces $p$ adapted to cooperate with corresponding faces on the sleeves $f\ w$ for guiding the table when it moves independently of the frames $f'$.

In operation the table is run out of the machine on the track $b'$ as shown in Fig. 2, a turnover plate $i$ and a flask $m$ are placed on the table $o$, the flask is filled with sand and the table and the presser-plate $a'$ are run into the machine. When the parts are in position, the pins $h$ are advanced toward the inside of the machine as described, securing the turn-over plate and the flask to the frame $f$, and the table is raised by means of the cylinder $c$, so that the sand in the flask $m$ is compressed by the presser plate $a'$. At the same time the hooks $y$ engage the pins $z$ of the frames $f'$.

When the pressing operation has come to an end, the table $o$ is lowered and run out, while the frames $f'$ with the turn-over plate $i$ and the flask $m$ are retained by the hook $y$. The presser plate $a'$ is run out also and the plate is turned over about the pins $h$ 180° as shown in Fig. 2. The table is now run in anew and raised as far as the bottom of the flask $m$, and the pins $h$ are withdrawn from the eyes $i''$. The turn-over plate $i$ is now free and may be loosened by tapping in the usual manner without interference of any kind. The pins $h$ are now advanced again, but only as far as required for securing the turn-over plate to the frames $f'$, without however engaging the flask $m$, and the table with the flask is lowered while the turn-over plate remains suspended on the frames and run out. The plate $i$ is then turned over into its initial position, the table $o$ is raised for releasing the pins $z$ of the frames $f'$ from the hooks $y$, and then lowered together with the frames $f'$ and the turn-over plate as far as the rings $g$ will permit, whereupon the pins $h$ are withdrawn from the eyes $i''$ and the table $o$ is run out to receive another flask $m$.

I wish it to be understood that I do not desire to be limited to the exact details of construction shown and described, for obvious modifications will occur to a person skilled in the art.

I claim:—

1. Molding machine comprising connected upper and lower heads, a presser plate secured to said upper head, a table on said lower head adapted to be run in and out of the machine, means for raising and lowering said table with regard to said presser plate, a turn-over plate adapted to be placed on said table, eyes on opposite sides of said turn-over plate, frames adapted to be displaced in conformity with the raising and lowering of said table, a pin in each frame adapted to be reciprocated and to enter one of said eyes and means for reciprocating said pins in said frames.

2. Molding machine comprising connected upper and lower heads, a presser plate secured to said upper head, a table on said lower head adapted to be run in and out of the machine, means for raising and lowering said table with regard to said presser plate, a turn-over plate adapted to be placed on said table, a flask adapted to be placed on said plate, eyes on opposite sides of said turn-over plate, frames adapted to be displaced in conformity with the raising and lowering of said table, pins adapted to be reciprocated in each frame and to enter one of said eyes, means for reciprocating said pins in said frames and a point at the end of each pin adapted to engage said flask.

3. Molding machine comprising connected upper and lower heads, a presser plate secured to said upper head, a table on said lower head adapted to be run in and out of the machine, means for raising and lowering said table with regard to said presser plate, a turn-over plate adapted to be placed on said table, eyes on opposite sides of said turn-over plate, frames adapted to be displaced in conformity with the raising and lowering of said table, automatic means for intermittently securing said frames to one of said heads, pins adapted to be reciprocated in each frame and to enter said eyes and means for reciprocating said pins in said frames.

4. Molding machine comprising connected upper and lower heads, a presser plate secured to said upper head, a table on said lower head adapted to be run in and out of the machine, means for raising and lowering said table with regard to said presser plate, a turn-over plate adapted to be placed on said table, eyes on opposite sides of said turn-over plate, frames adapted to be displaced in conformity with the raising and lowering of said table, a pin secured to each frame, hooks pivoted to said upper head and adapted to engage said pins on said frames, pins adapted to be reciprocated in each frame and to enter said eyes and means for reciprocating said pins in said eyes.

5. Molding machine comprising connected upper and lower heads, a movable presser plate secured to said upper head, a table on said lower head adapted to be run in and out of the machine, means for raising and lowering said table with regard to said presser plate, a turn-over plate adapted to be placed on said table, eyes on opposite sides of said turn-over plate, frames adapted to be displaced in conformity with the raising and lowering of said table, pins adapted to be reciprocated in each frame and to enter said eyes, and means for reciprocating said pins in said frames.

In testimony whereof I affix my signature.

OTTO MÜLLER.